United States Patent
Tozuka et al.

[11] Patent Number: 5,981,023
[45] Date of Patent: Nov. 9, 1999

[54] FIBER-REINFORCED COMPOSITE STRUCTURAL ELEMENT AND METHOD OF MANUFACTURING THE SAME

[75] Inventors: Shoichiro Tozuka; Mitsuo Nishimoto; Kyoichi Masugi; Kazuaki Amaoka, all of Utsunomiya, Japan

[73] Assignees: Japan Aircraft Development Corporation; Fuji Jukogyo Kabushiki Kaisha, both of Tokyo-To, Japan

[21] Appl. No.: 08/665,226

[22] Filed: Jun. 18, 1996

[30] Foreign Application Priority Data

Jun. 21, 1995 [JP] Japan .................................. 7-154756

[51] Int. Cl.⁶ ............................ B29C 67/14; B29D 31/00
[52] U.S. Cl. ......................... 428/105; 428/108; 428/109; 428/111; 264/258
[58] Field of Search ...................... 428/105, 109, 428/111, 408; 265/258

[56] References Cited

FOREIGN PATENT DOCUMENTS

| 0531840 | 3/1993 | European Pat. Off. . |
| 0556088 | 8/1993 | European Pat. Off. . |
| 0603066 | 6/1994 | European Pat. Off. . |
| 63-124119 | 8/1988 | Japan . |
| 4-334696 | 11/1992 | Japan . |
| 2225277 | 11/1989 | United Kingdom . |
| 84/04940 | 12/1984 | WIPO . |
| 93/15904 | 8/1993 | WIPO . |

Primary Examiner—Richard Weisberger
Attorney, Agent, or Firm—Smith, Gambrell & Russell

[57] ABSTRACT

A box-shaped fibrous preform is produced by laying or superposing a plurality of reinforcing fibrous material layers (6a) on top of each other into a box-like shape. The box-shaped fibrous preform is used as an auxiliary member (1) or by cutting the box-like member into segments of a required shape. The auxiliary member (1) is combined with reinforcing fibrous material forming a main structural member. The auxiliary member and the main structural member are placed in a mold and a resin is supplied into the mold to carry out a resin-impregnating and curing operation.

37 Claims, 10 Drawing Sheets

FIBER-REINFORCED COMPOSITE STRUCTURAL ELEMENT AND METHOD OF MANUFACTURING THE SAME

BACKGROUND OF THE INVENTION

1. Field of the Invention

The present invention relates to a fiber-reinforced composite structural element usable, e.g., for an aircraft fuselage structure and a method of manufacturing the same.

2. Description of the Related Art

A structural element of a fiber-reinforced composite material for use in, e.g., fuselage structures of aircraft, is principally made by superposing on a lay-up jig prepregs composed of reinforcement fibers such as glass fibers previously impregnated with a resin; pressing and curing the prepregs to give a shape in an autoclave; subjecting the thus obtained shape element to, e.g., a secondary adhesion to form a composite sub-assembly, and finally assembling several composite sub-assemblies together by use of fastener means.

Figure 19:
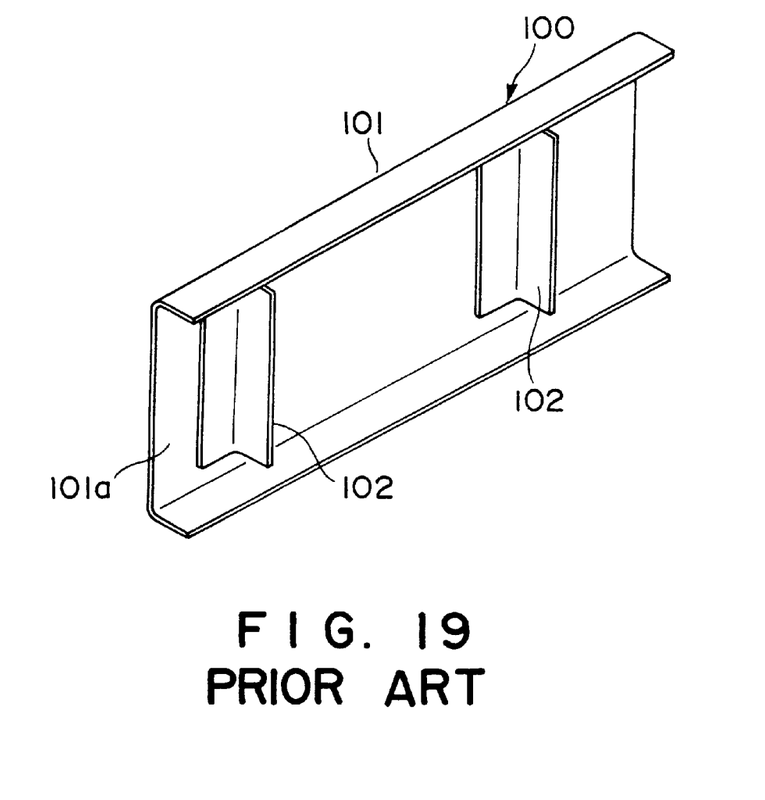
FIG. 19 is a perspective view showing a conventional beam structural element.
Figure 20:
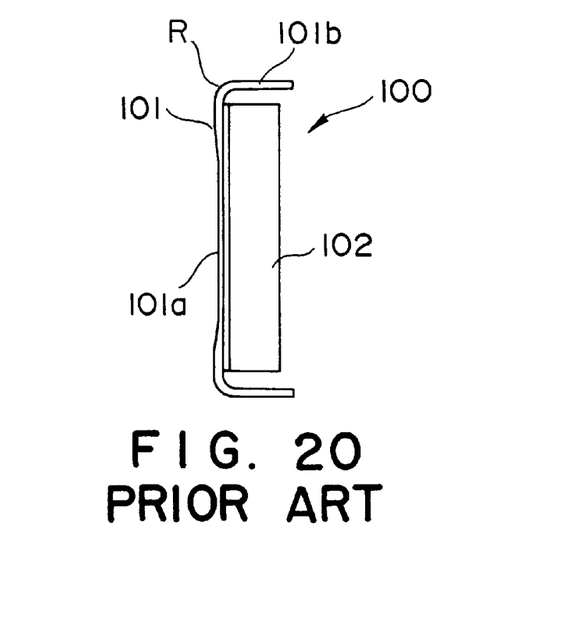
FIG. 20 is a side elevational view of the conventional beam structural element.

FIG. 19 illustrates a conventional stiffener reinforced beam structure as an example. The stiffener reinforced beam structure 100 comprises a beam member 101 previously formed into a C-shape in cross section and having a web portion 101a and flange portions 101b, and stiffeners 102 previously formed into L-shape in cross section and secured to the web portion 101a by means of an adhesive or fasteners. In order to increase the stiffness of the web portion 101a, as shown in FIG. 20, the stiffener reinforced beam structure 100 makes use of means for reinforcing by padding the vicinities of corners R between the flange portions 101b and the web portion 101a.

Japanese Patent Laid-open Pub. No. Hei4-334696 published Nov. 20, 1992, for instance, discloses a reinforcement panel for the fiber-reinforced composite material, which panel comprises a frame having an opening formed by bending a cut portion in the frame to provide flanges, a stringer inserted into the opening of the frame and having an outer surface thereof joined to the flanges, and a skin joined to the frame and the stringer.

Japanese Utility Model Pub. No. Sho63-124119 published Aug. 12, 1988 discloses a coupling for a fiber reinforced composite material which is formed by laying up members composed of fiber-reinforced composite material. The coupling includes a fiber-reinforced composite filler material provided at a boundary part of the coupling. Around or within the filler material is inserted a fiber-reinforced composite material impregnated with a resin and having a lattice-like base in which whiskers such as silicon carbide are dispersed. The members, the filler and the composite material are subjected to a forming/curing treatment.

There are methods to form a box-shaped or similarly shaped structure in which three planes intersect at one point as can be often seen in an aircraft structure. One method is to use a prepreg material of woven fabric having a high shape-maintaining capability such as satin weave. Another method is to use a fastener coupling like metal fittings.

An aircraft structure includes many structural elements having so-called box-like configurations in which three planes intersect at one point. Such structural elements are typically fabricated by machine tool cutting from a metal block or by sheet metal working, but in the case of a composite material by the above-described method.

When producing a composite material component in accordance with a widely used conventional method, prepregs are laid up on a forming jig by hand or by machine (lay-up machine). In the case of producing a composite structure having a complicated configuration, the formation of the composite structure is effected either by manual laying up or by sub-assembling composite components with secondary adhesion. This necessitated an exclusive jig for the adhesion, and also needs repetition of curing under pressure in an autoclave for the purpose of forming the components as well as curing the adhesive because of use of a thermally curing type adhesive from design requirements. This resulted in a relatively high production cost.

It is envisaged that such higher production cost of the composite structure due to these factors is a cause of limited use of composite structural elements in spite of their superior properties in terms of specific strength, specific stiffness, and corrosion resistance. Furthermore, in the case of forming composite material elements having a complicated configuration such as a box-like configuration by means of an integral forming process, use is made of woven fabrics having a high shape-maintaining capability such as satin weave. However, laying up of the prepregs of woven fabric having a high shape-maintaining capability onto the forming jig required high skill to the worker and resulted in a difficulty in thickness control of the composite elements and hence in an unstable quality.

SUMMARY OF THE INVENTION

The present invention was conceived in view of the above problems. It is an object of the present invention to provide a fiber-reinforced composite structural element and a method of manufacturing the same in which the quality of the produced element is stable, the thickness control can be made easy and the production cost is reduced.

According to an aspect of the present invention, there is provided a fiber-reinforced composite structural element which comprises a main structural member including a reinforcing fibrous material; an auxiliary member; the auxiliary member being a fibrous preform including a lamination of a plurality of reinforcing fibrous material layers superposed on top of each other into a three-dimensional configuration; and the fibrous preform of the auxiliary member being combined together with the reinforcing fibrous material forming the main structural member and being molded integrally into a predetermined configuration with a resin impregnated in both the main structural member and the auxiliary member.

In the present invention, the fibrous material may comprise a woven fabric.

In the present invention, the fibrous preform may be in the shape of a box having a rectangular section and an open one side.

The present invention also provides a fiber-reinforced composite structural member, comprising the steps of: providing a box-shaped jig having a bottom surface directed upward and having side walls extending downward from said bottom surface; placing reinforcing fiber material layers on said bottom surface of the jig; causing portions of said fiber material layers, extending outward beyond said bottom surface, to extend downward along said side walls to produce an inverted-box-shaped dry preform; impregnating said preform with a resin; and curing the preform.

According to another aspect of the present invention, there is provided a method of manufacturing a fiber-reinforced composite structural element which comprises the steps of superposing a plurality of reinforcing fibrous material layers on top of each other into a three-dimensional configuration to form a fibrous preform; combining the fibrous preform with reinforcing fibrous material forming a main structural member; disposing within a mold the fibrous preform together with the fibrous material forming the main structural member; supplying a resin into an interior of the mold to impregnate the resin in both the fibrous preform and the fibrous material forming the main structural member; and subjecting the fibrous preform and the fibrous material impregnated with the resin to a curing operation to obtain the composite structural element.

The present invention also provides a fiber-reinforced composite structural member, comprising: a fibrous preform including a lamination of a plurality of reinforcing fiber material layers superposed on top of each other into a box-like configuration; and said preform being impregnated with a resin and cured to form an integral structural element in combination with another structural member.

The fiber-reinforced composite structural element of the present invention uses, as fundamental components, a dry preform which has been woven into, e.g., a box-like shape from reinforcing fibers such as carbon fibers or glass fibers, as well as a required number of unidirectionally oriented reinforcing threads or woven fabrics made of fibers such as carbon fibers or glass fibers. The dry preform and the threads or woven fabrics are integrally molded and cured by use of a RTM (Resin Transfer Molding) method described later. Thus, it realizes a simple thickness control and a stable product quality.

The method of producing a fiber-reinforced composite structural elements ensures a remarkable reduction in production cost because of no need for sub-assembling by secondary adhesion and no need for superposition by hand, as well as easy thickness control and stable quality of the thus formed fiber-reinforced composite structural element by the RTM method.

Preferred embodiments of the present invention will become understood from the following detailed description referring to the accompanying drawings.

DESCRIPTION OF THE PREFERRED EMBODIMENTS

Figure 1:
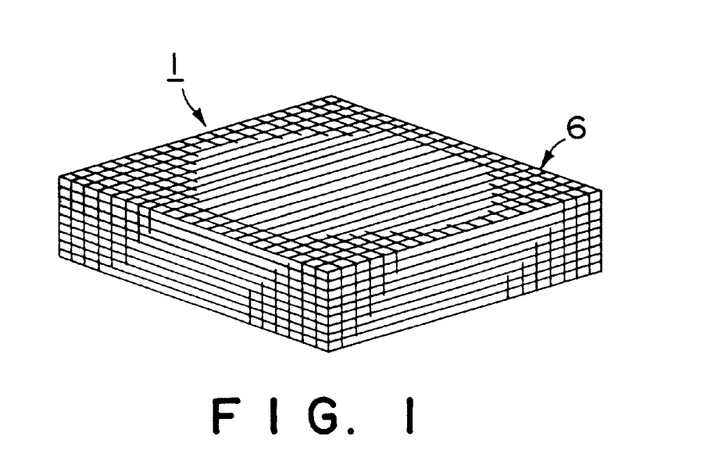
FIG. 1 is a perspective view of a box-shaped dry preform for use in a fiber-reinforced composite structural element according to the present invention.

FIG. 1 illustrates, in perspective view, a box-shaped dry preform generally designated at 1, for use in a structural element made of a fiber-reinforced composite according to the present invention. As is apparent from FIG. 2, the dry preform 1 comprises a laminated structure of a plurality of carbon-fiber woven fabric layers 6 each consisting of X-directional carbon fiber threads 2, Y-directional carbon fiber threads 3, Z-directional carbon fiber threads 4 and R-directional carbon fiber threads 5.

Figure 2:
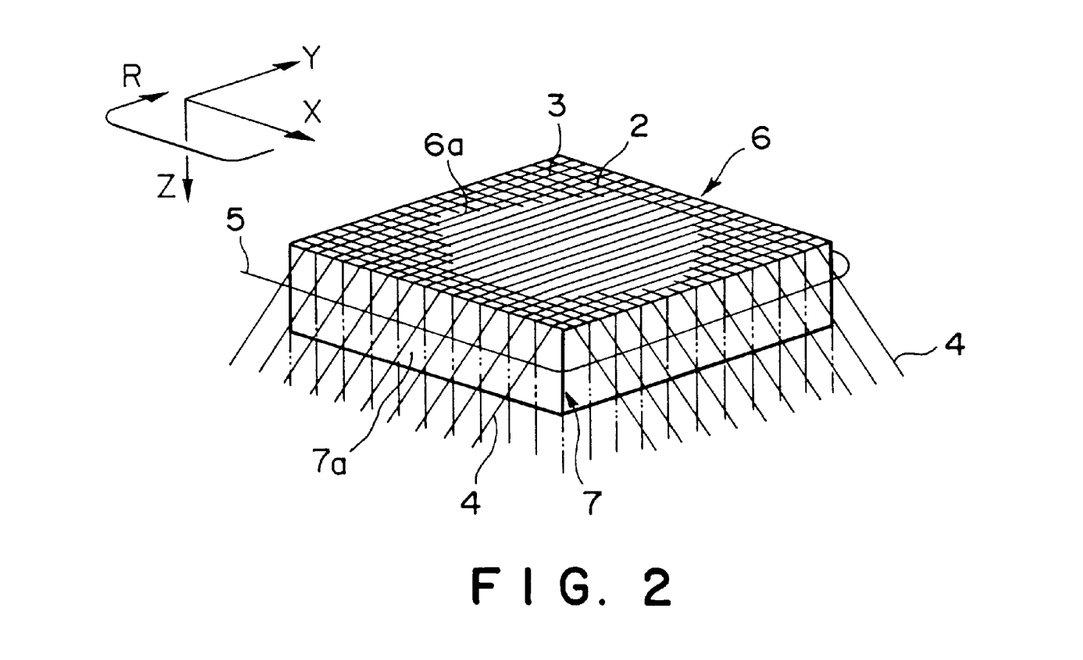
FIG. 2 is a perspective view showing a method of forming carbon fiber woven fabrics constituting the box-shaped dry preform of FIG. 1.

As can be seen in FIG. 2, each carbon-fiber woven fabric layer 6 is formed by placing a carbon-fiber woven material 6a on a parallelpiped-box-shaped jig 7 and then bending or shaping portions of the woven material 6a extending outwardly beyond the top surface of the jig 7 downwardly as viewed in the figure. More specifically, the portions of the X-directional threads 2 and the Y-directional threads 3 that extend beyond the top surface of the jig 7 are bent to be directed in the Z-direction so as to extend along lateral surfaces 7a of the jig 7 as the Z-directional threads 4. The thus obtained Z-directional threads 4 and the R-directional threads 5 extending around the jig 7 are woven by hand or by mechanical operation into a woven fabric.

While the above-described dry preform 1 is formed by superposing a plurality of carbon fiber woven fabric layers 6 on top of one another, the number of the layers 6 to be superposed is determined depending on the thickness of the preform 1 necessary to meet the strength/design requirements. The carbon fiber woven fabric layers superposed into a box-shaped dry preform 1 are united together so as not to shift relative to each other, by stitching the fabric layers in the thickness direction with carbon fiber threads.

Figure 3:
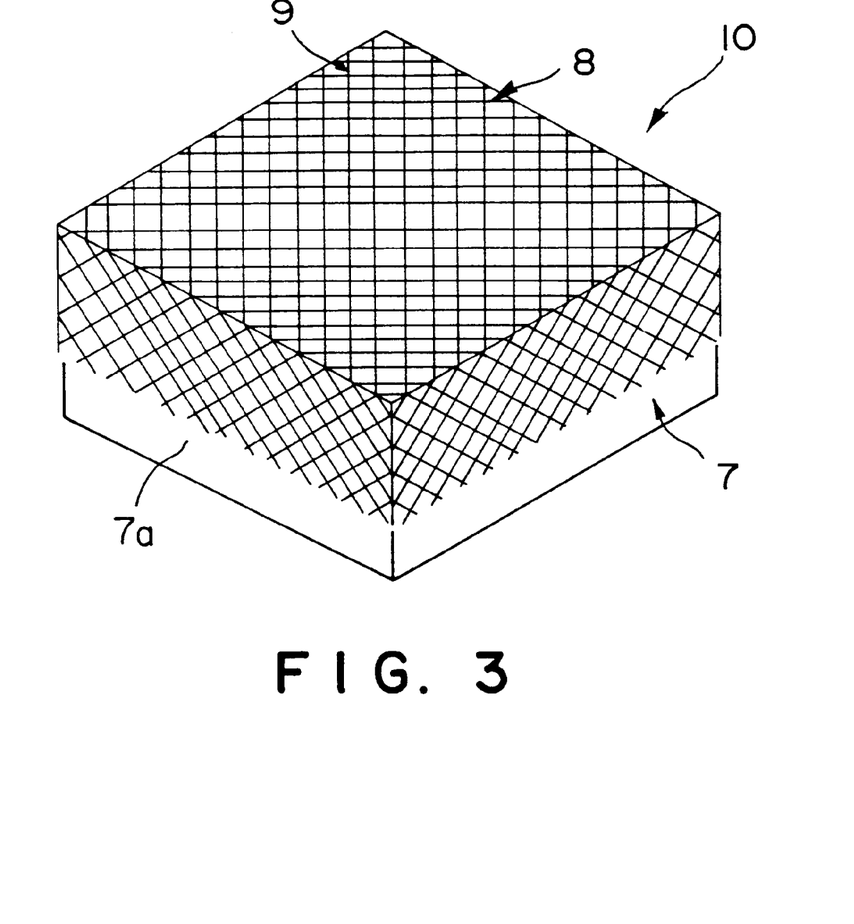
FIG. 3 is a perspective view showing a modified method of forming the carbon fiber woven fabrics.

As an alternative, the box-shaped dry preform 1 may comprise a lamination of a plurality of carbon fiber woven fabric layers 10, each formed as shown in FIG. 3 by disposing a carbon fiber woven material on the jig 7 in such a manner that carbon fiber threads 8 and 9 extend diagonally with respect to the edges of the jig 7 and by weaving, along the lateral surfaces 7a of the box-shaped jig 7, the threads 8 and 9 extending outward diagonally from the top surface of the jig 7.

Figure 4:
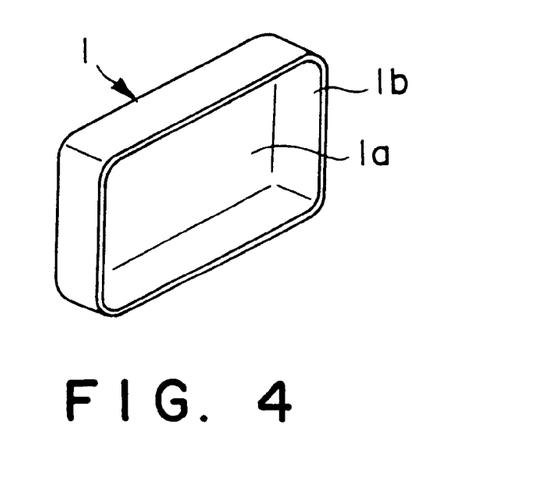
FIG. 4 is a perspective view showing a box-shaped auxiliary member of the fiber-reinforced composite structural element according to the present invention.

As is clear from FIG. 4, the thus formed box-shaped dry preform 1 is in the shape of a one-side-open box having a planar bottom portion 1a and sidewalls 1b extending upright from the planar portion 1a, with the remaining side opposite to the planar portion 1a being opened.

Figure 5:
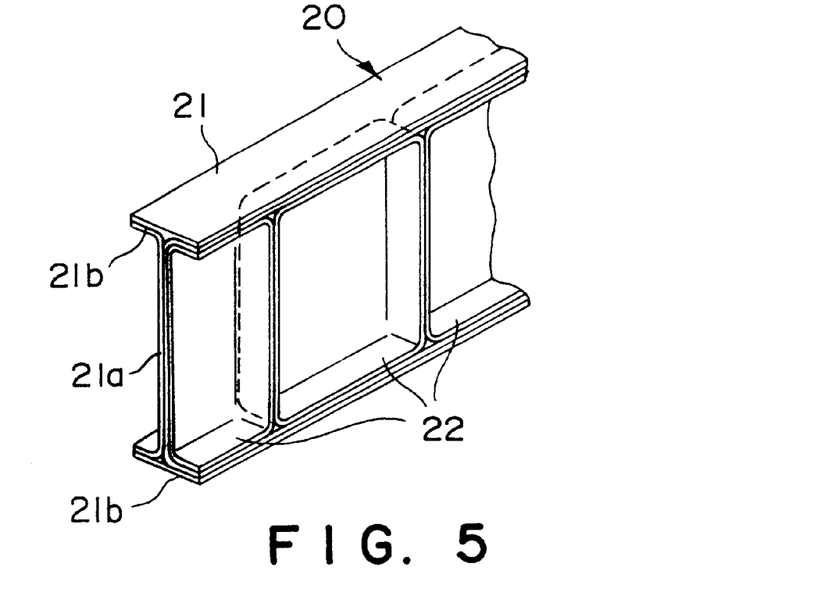
FIG. 5 illustrates an example in which a fiber-reinforced composite structural element according to the present invention is used in a beam structural element.

FIG. 5 illustrates a beam structural element 20 incorporating the box-shaped dry preform 1 as a reinforcement material. The beam structural element 20 includes a beam-shaped main structural member 21 having an I-shaped cross-sectional profile and including a web portion 21a and flange portions 21b, and box-shaped auxiliary members 22 joined to the web portion 21a of the structural member 21.

The beam structural element 20 is molded as follows. The box-shaped dry preforms 1 are placed on a base of an impregnation/curing jig not shown; carbon-fiber woven fabric layers or carbon-fiber unidirectional thread layers are superposed on the base of the impregnation/curing jig to be formed as a web and flanges of a beam-shaped dry preform; carbon fibers are filled in layers to be formed as fillet portions of the beam-shaped dry preform; the impregnation/curing jig are assembled to form a mold; the interior of the impregnation/curing mold is evacuated and then supplied with a resin; and after the interior of the mold has been filled with the resin, a heating/curing treatment is carried out. This is a RTM (Resin Transfer Molding) method. This method is one for producing a composite material, which comprises the steps of disposing within a closed jig or mold a preform formed of fibers having not yet been impregnated with resin; and filling the resin into the interior of the closed mold for impregnation. In this manner, the beam structural element 20 is molded by juxtaposing the box-shaped dry preforms; combining the preforms with the carbon-fiber woven fabric layers or unidirectional thread layers to form a beam-shaped dry preform and by using the RTM molding method. The thus molded beam structural element 20 can accomplish a substantial reduction in production cost as compared with a beam structural element produced by a conventional method in which the beam portion and stiffeners are separately molded and cured, and thereafter joined together by secondary adhesion.

Figure 6:
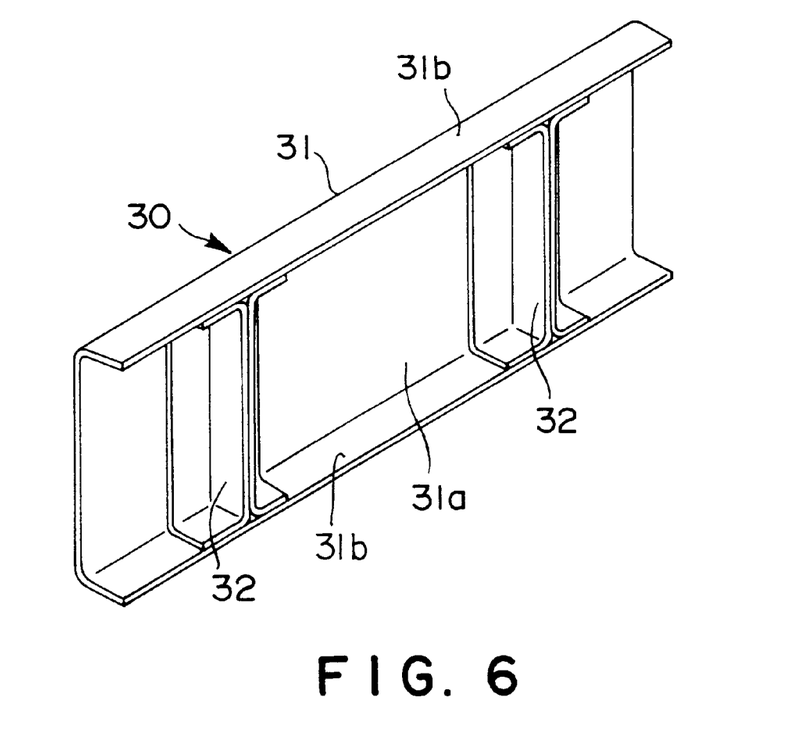
FIG. 6 illustrates a modification of the beam structural member of FIG. 5.
Figure 7:
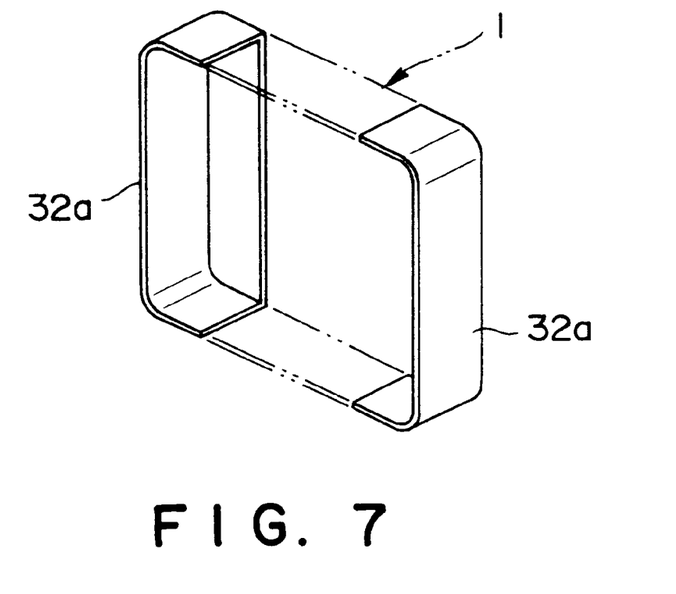
FIG. 7 is a view showing a state in which the box-shaped auxiliary member of FIG. 4 is cut into segments.
Figure 8:
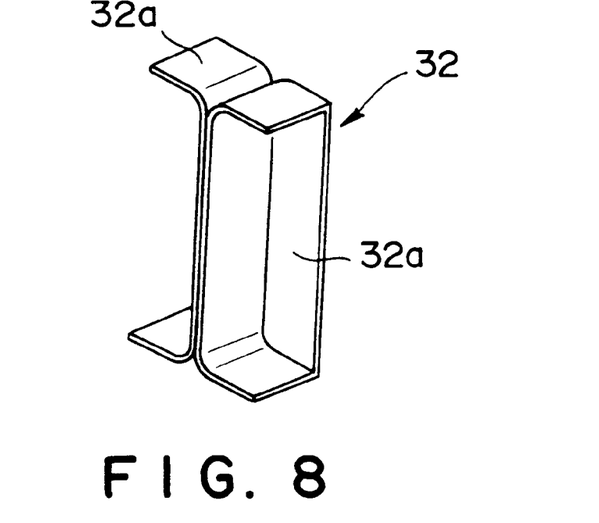
FIG. 8 is a view showing an auxiliary member of the fiber-reinforced composite structural element according to the present invention.

FIG. 6 illustrates a modification of the beam structural element 20 shown in FIG. 5. A beam structural element 30 shown in FIG. 6 includes a beam-shaped main structural member 31 having a U-shaped cross-sectional profile, and auxiliary members 32 joined to a web portion 31a and flange portions 31b of the main structural member 31. In order to form the auxiliary member 32, the box-shaped dry preform 1 is cut at an intermediate portion thereof into two segmented dry preforms 32a as shown in FIG. 7, and then the two segmented dry preforms 32a are united back to back as shown in FIG. 8. The thus formed auxiliary member 32 serves as a stiffener element having joint surfaces to be joined to the web surface and the flange surfaces of the beam-shaped dry preform. The two oppositely facing segmented dry preforms 32a may be joined together by stitching with carbon fibers.

Figure 9:
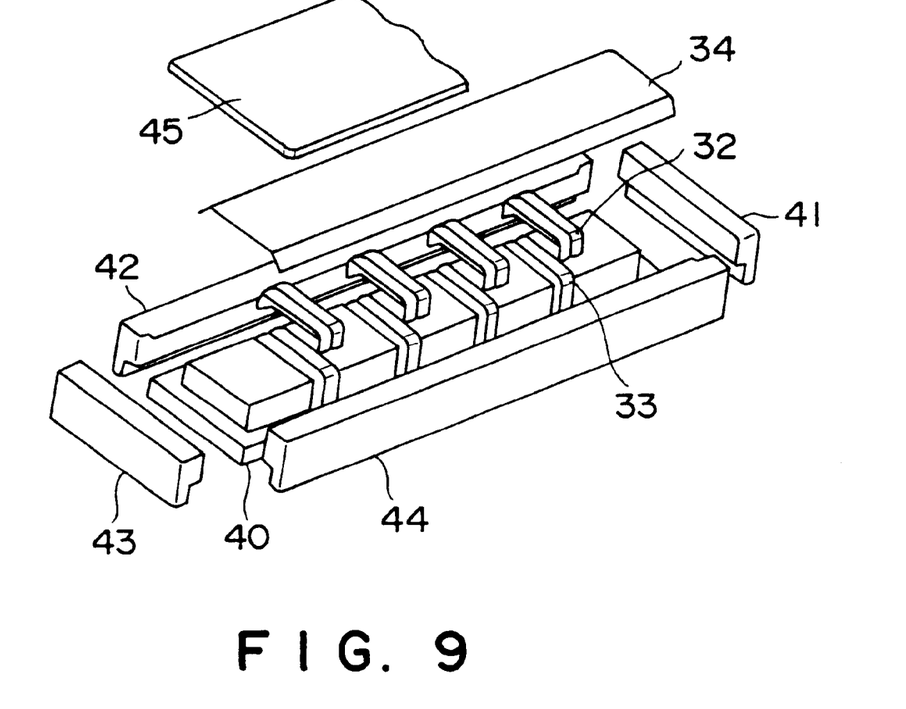
FIG. 9 is a perspective view showing a molding jig for use with the beam structural element of FIG. 6.
Figure 10:
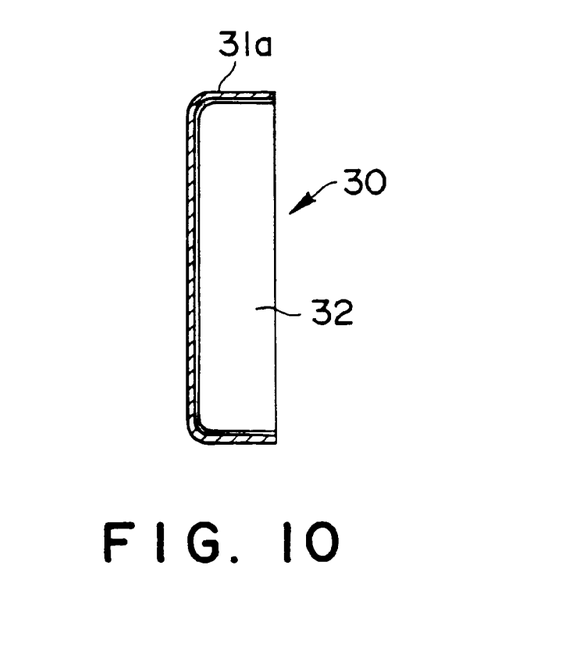
FIG. 10 is a cross-sectional view of the beam structural element of FIG. 6.

Molding of the beam structural element 30 is carried out, as shown in FIG. 9, by setting the auxiliary member (stiffener elements) 32 onto a base 40 of an impregnation/curing jig, filling carbon fibers into fillet portions 33 of the auxiliary member 32, superposing carbon-fiber woven fabric layers or unidirectional thread layers to be formed as a web portion and flange portions of a beam-shaped main structural member 31, assembling all parts 41, 42, 43, 44, and 45 of the impregnation/curing jig to form a mold, evacuating the interior of the mold, filling the interior of the mold with a resin, and carrying out the heating/curing treatment. The obtained beam structural element 30 has auxiliary members 32 integrally secured to the web surface and the flange surfaces of the main structural member 31, the flange portions 31a thus obtained have a constant combined thickness in section as shown in FIG. 10, and the auxiliary members 32 directly support the flange portions 31a of the main structural member 31 in order to prevent buckling of the web, unlike the conventional stiffener-reinforced beam structure. This leads to a stable structure, hence eliminates the need to increase the thickness, and ensures more effective determination of the web thickness than in the beam structural element 100 shown in FIG. 19. It is thus possible to realize not only a reduction in weight but also a reduction in production cost by an order of 20% as a result of the reduction in the number of components and the integral molding by the RTM method.

Figure 11:
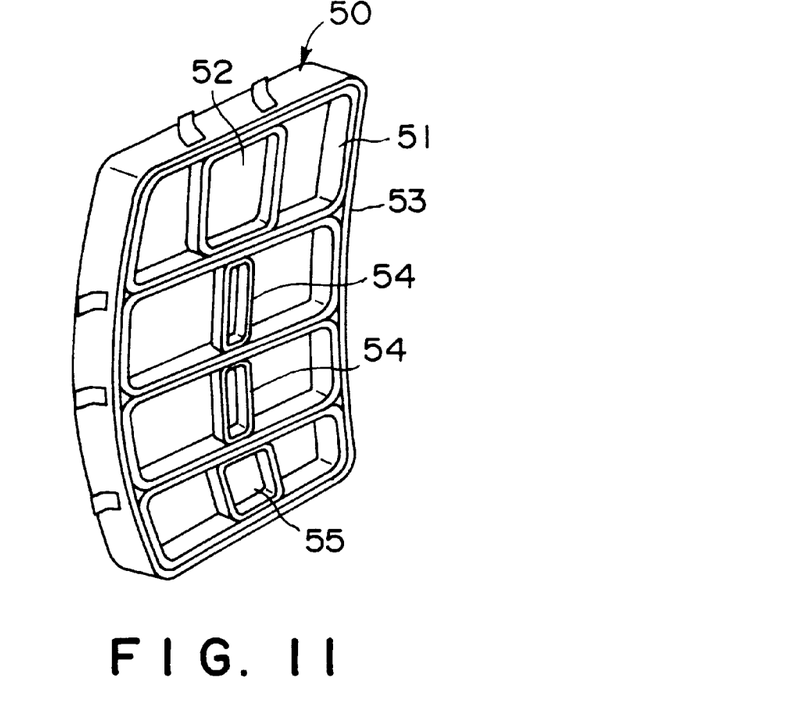
FIG. 11 illustrates an example in which a fiber-reinforced composite structural element according to the present invention is used in a composite door structure for an aircraft.

FIG. 11 illustrates as an example of a flanged plate-like structure, a composite door structure 50 for an aircraft employing the fiber-reinforced composite structural member according to the present invention.

Figure 12:
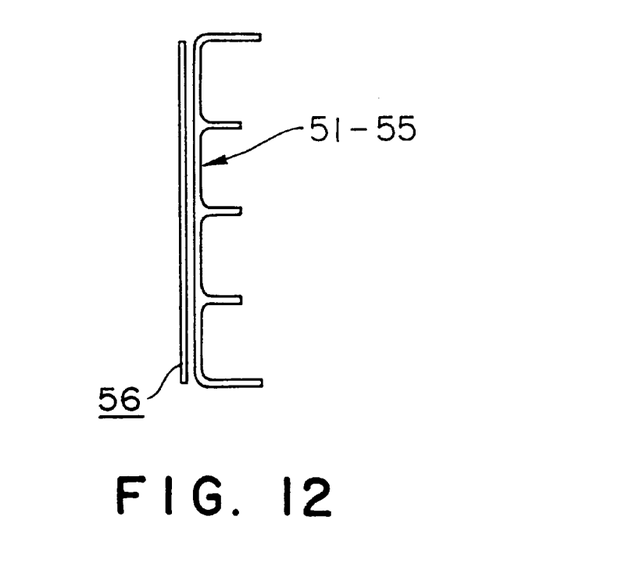
FIG. 12 is a diagrammatic cross-sectional view of the composite door structure of FIG. 11.

The composite door structure 50 is fabricated by using varied shapes and dimensions of the box-shaped jig 7 shown in FIG. 2 to form a plurality of different types of box-shaped preforms 51 to 55; setting the preforms 51 to 55 and carbon fiber unidirectional threads or woven fabrics 56 (FIG. 12) on a jig in accordance with the method shown in FIG. 9; and carrying out the RTM molding method. The largest box-shaped preform 53 serving as an outer frame is fabricated by placing a plurality of box-shaped preforms woven by the same method as in FIG. 2; and separately placing four frame members constituting a rectangular outer frame and a back sheet material. It is to be appreciated that since in this case the box-shaped preforms 51 to 55 have curved contours, corresponding jigs are also contoured. In the case of small contours, planar box-shaped preforms are formed by the same method as in FIG. 2 and then the contours are given at the stage of the resin impregnation and curing treatment.

The composite door structure 50 for aircraft can realize approximately 20% weight reduction as compared with the conventional metal structure and approximately 20% cost reduction as compared with the conventional composite structure.

Figure 13:
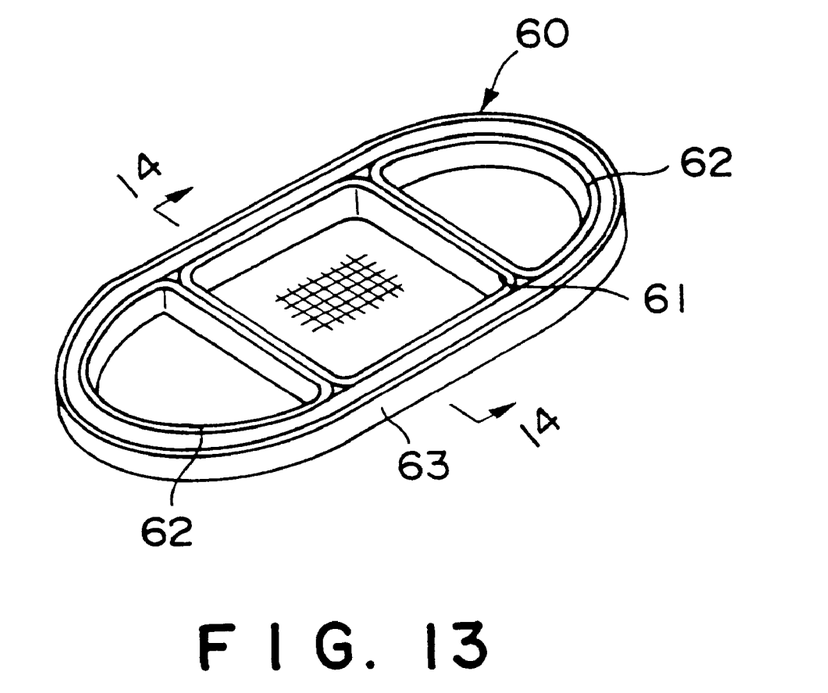
FIG. 13 illustrates an example in which a fiber-reinforced composite structural element according to the present invention is used in a composite access panel for aircraft.
Figure 14:
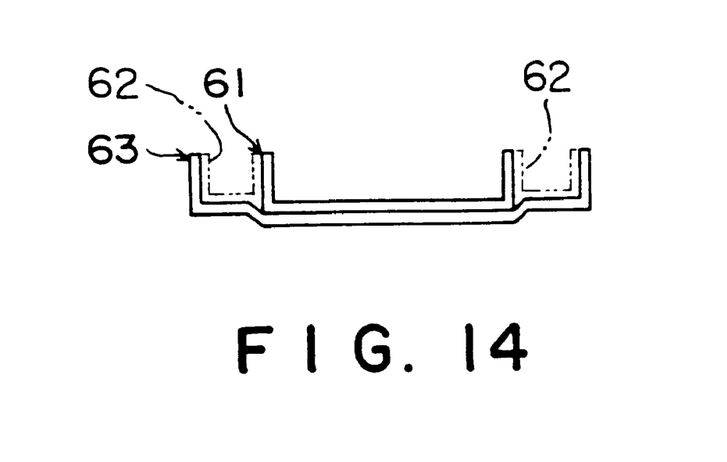
FIG. 14 is a cross-sectional view taken along a line A—A of FIG. 13.

FIG. 13 illustrates, as an example of a flanged plate-like structure, a composite integral molding access panel 60 incorporating the fiber-reinforced composite structural member according to the present invention. A method of fabricating the composite integral molding access panel 60 includes the steps of using varied shapes and dimensions of the box-shaped jig 7 shown in FIG. 2 to form a plurality of different types of box-shaped preforms 61, 62, 63; setting the preforms 61, 62, 63 on a molding jig in accordance with the jig described in FIG. 9; and executing the RTM method described before in connection with the above embodiments. In this case, the box-shaped preform 63 may be fabricated by pressing a sheet material. Alternatively, it may be fabricated by weaving to some extent a planar preform by using a general-purpose machine; thereafter weaving by hand or by machine depending on the jig used; repeating these series of operations for lamination; and stitching the laminated structures. The preforms 62 serving as a stiffener may be fabricated by weaving to some extent a planer preform by using the ordinary machine and thereafter weaving by hand or by machine depending on the jig used in the same manner as in the case of the semi-circular sections of the box-shaped preforms 63 serving as the outer frame. Alternatively, it may be woven by setting a preform on the jig from the beginning.

The thus molded access panel can realize approximately 20% weight reduction as compared with the conventional metal structure and approximately 20% cost reduction as compared with the conventional composite structure.

Figure 15:
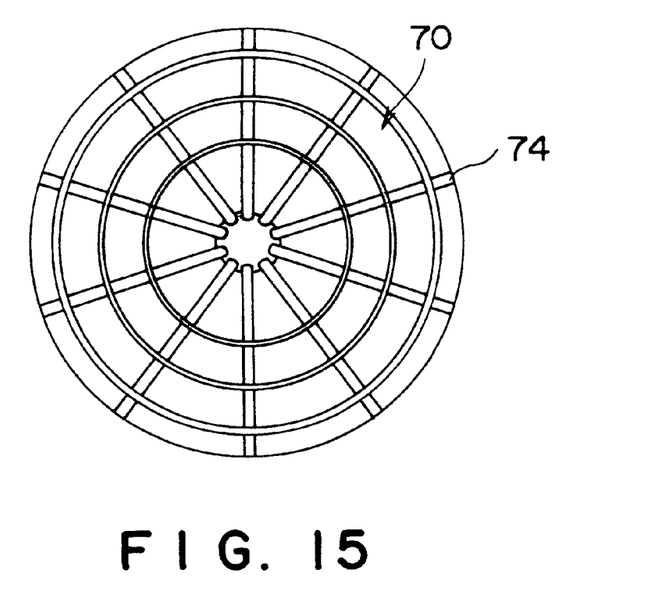
FIG. 15 illustrates an example in which a fiber-reinforced composite structural element according to the present invention is used in a bulkhead wall for an aircraft.

FIG. 15 illustrates a bulkhead wall 70 for aircraft employing the fiber-reinforced composite structural member according to the present invention. As is apparent from FIG. 16, the bulkhead wall 70 includes a crown preform 71, a plurality of gore preforms 72 and a carbon fiber woven fabric or a unidirectional thread material 73.

Figure 16:
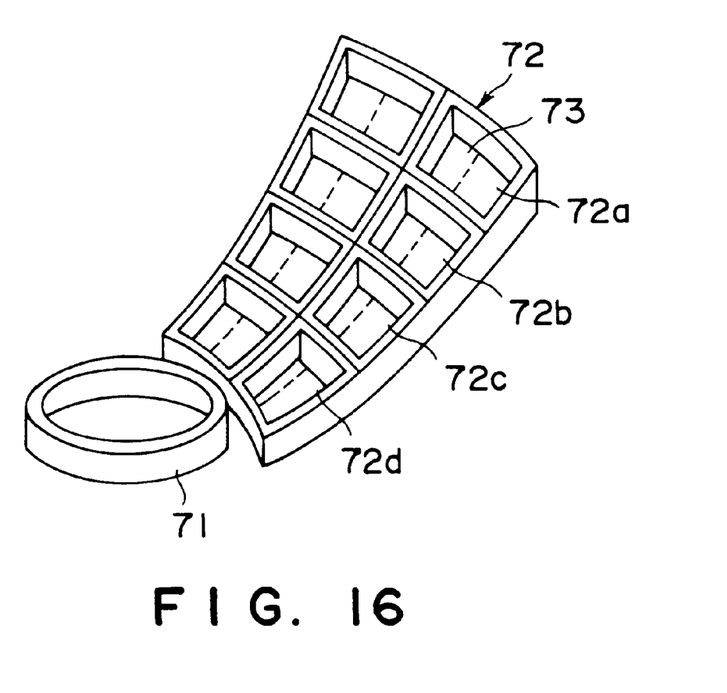
FIG. 16 is a perspective view showing a part of the bulkhead wall of FIG. 15.

The crown preform 71 may be fabricated by weaving to some extent a planer preform by using the general-purpose machine and thereafter weaving by hand or by machine depending on the jig used. Alternatively, the crown preform 71 may be woven by setting it on the jig from the beginning. The gore preforms 72 each include a plurality of small gore preforms 72a, 72b, 72c and 72d which are linked with one another. In the same manner as the case of the crown preform 71, each small preform may be fabricated by weaving to some extent a planer preform by using the general-purpose machine; thereafter weaving by hand or by machine depending on the jig used; weaving with R-direction threading; repeating the above-mentioned procedures for lamination; and stitching the laminated structures. In order to fabricate the gore preform 72, a carbon-fiber woven fabric or a unidirectional thread material 73 is arranged on the back surfaces of the small gore preforms 72a, 72b, 72c and 72d; and stitching is performed between the small gore preforms or between the small gore preform and the carbon fiber woven fabric or the unidirectional thread material.

The composite bulkhead wall 70 for aircraft may be fabricated by setting on a jig in accordance with the concept shown in FIG. 9 a predetermined number of preforms 71 and 72, carbon fiber unidirectional thread materials or woven fabrics 73, and reinforcement materials 74 obtained by shaping the carbon-fiber unidirectional thread materials or woven fabrics into a Z-shaped cross section; and subjecting the above members together to the RTM method. Alternatively, it may be fabricated by setting on a jig in accordance with the concept shown in FIG. 9 a predetermined number of preforms 71 and 72, and carbon fiber unidirectional thread materials or woven fabrics 73; subjecting them together to the RTM molding method; and attaching separately molded reinforcement materials 74 to them by means of secondary adhesion or fastener assembling.

The thus molded composite bulkhead wall for aircraft can realize approximately 20% weight reduction as compared with the conventional metal structure and approximately 20% cost reduction as compared with the conventional composite structure.

Figure 17:
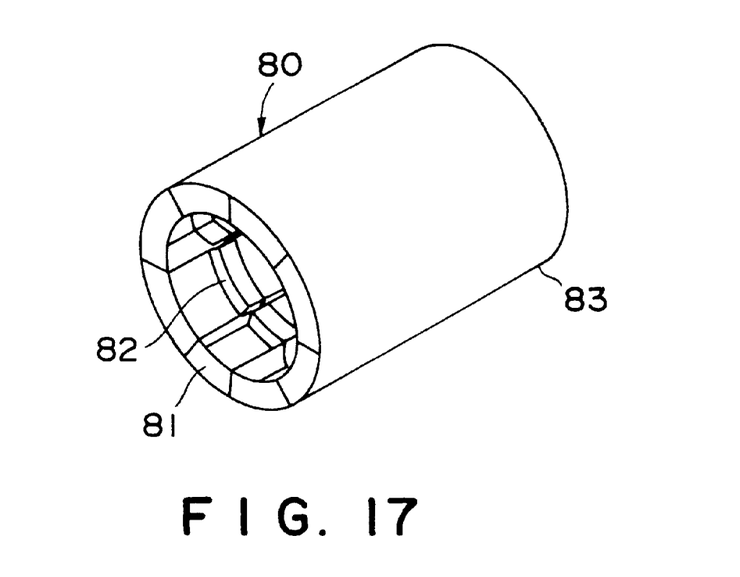
FIG. 17 illustrates an example in which a fiber-reinforced composite structural element according to the present invention is used in a composite fuselage structure for an aircraft.
Figure 18:
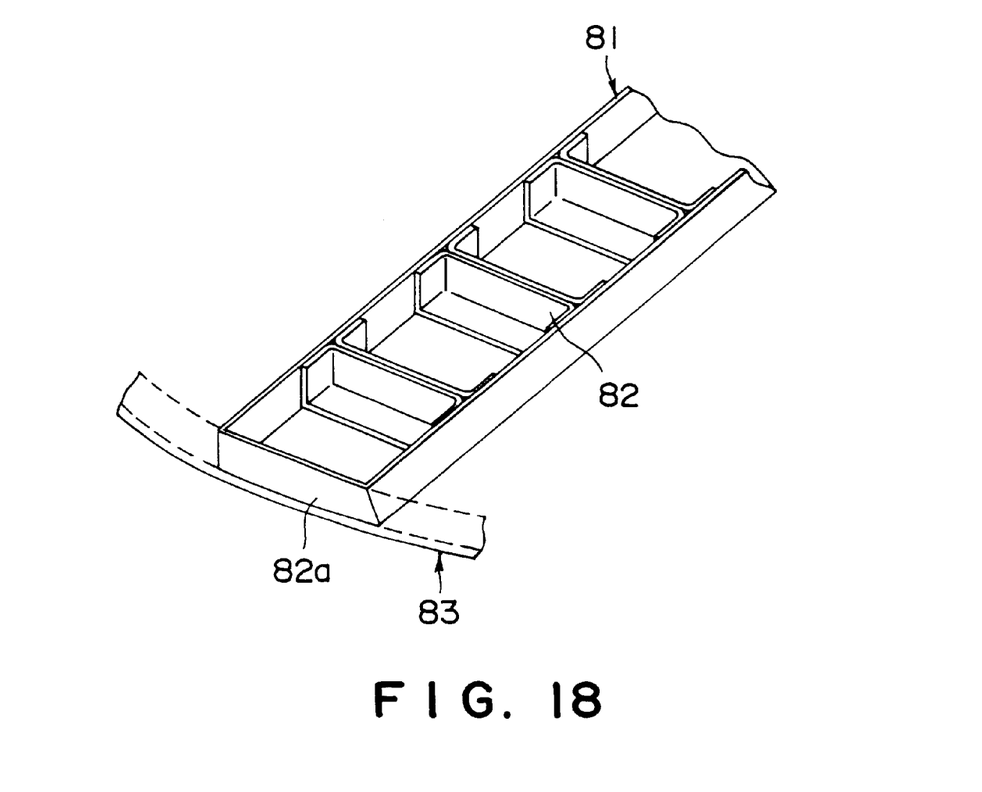
FIG. 18 is a development of a part of FIG. 17.

FIG. 17 illustrates a composite fuselage structure 80 for an aircraft, having a substantially cylindrical shape and incorporating the fiber-reinforced composite structural element according to the present invention. The composite fuselage structure 80 includes box-shaped preforms 81, stiffener preforms 82 and carbon fiber woven fabrics or unidirectional thread materials 83. The box-shaped preforms 81 are each formed on a split-type jig having a curved contour and a center angle, and then are removed from the jig by disassembling the jig. The stiffener preforms 82 are disposed on the box-shaped preforms 81 at appropriate intervals, the stiffener preforms 82 being fabricated in the same manner as the preform 3 shown in FIG. 6.

The composite fuselage structure 80 is fabricated by making the box-shaped preforms 81 and the stiffener preforms 82; and resin-transfer-molding a predetermined number of preforms 81 and 82 and carbon fiber unidirectional thread materials or woven fabrics 83.

The thus molded composite fuselage structure 80 can realize approximately 20% weight reduction as compared with the conventional metal structure and approximately 20% cost reduction as compared with the conventional composite structure.

According to the present invention as set forth hereinabove, the structural elements made of fiber-reinforced composite will ensure an easy control of the thickness as well as a reduced production cost and a stable quality.

The method of producing a fiber-reinforced composite structural element will not only ensure a remarkable reduction in production cost due to no need for sub-assembling by the secondary adhesion and no need for manual laying up or superposition, but also realize a stable composite integral molding structure of which thickness control is easy to perform by the resin-transfer molding of materials obtained by weaving the reinforcement fibers into a three-dimensional configuration.

While the presently preferred embodiments of the present invention have been shown and described, it is to be understood that these embodiments are for the purpose of illustration and that various changes and modifications may be made without departing from the scope of the invention as set forth in the appended claims.

What is claimed is:

1. A fiber-reinforced composite structural element, comprising:

a structural member including a reinforcing fibrous material;

at least one auxiliary member, said at least one auxiliary member being a fibrous preform having a plurality of first reinforcing threads extending in a first direction and a plurality of second reinforcing threads extending in a second direction across the first direction, said plurality of first reinforcing threads and said plurality of second reinforcing threads are formed into a three-dimensional configuration;

a resin impregnated in said structural member and said at least one auxiliary member; and wherein said at least one auxiliary member combined together with said structural member such that said at least one auxiliary member nests within said structural member and against other auxiliary members, and wherein said structural member has walls of a uniform thickness.

2. The fiber-reinforced composite structural element according to claim 1, wherein:

said plurality of first reinforcing threads and said plurality of second reinforcing threads form a fiber woven fabric.

3. The fiber-reinforced composite structural element according to claim 1, wherein:

said at least one auxiliary member is a box with a closed bottom and an opening.

4. The fiber-reinforced composite structural element according to claim 3, wherein:

said box is rectangular.

5. The fiber-reinforced composite structural element according to claim 4, wherein:

said box has a curved side wall.

6. The fiber-reinforced composite structural element according to claim 1, wherein:

said at least one perform is a split segment of a box.

7. The fiber-reinforced composite structural element according to claim 1, wherein:

said main structural member comprises a beam with a web and flanges and said auxiliary member is disposed on the web and between the flanges.

8. The fiber-reinforced composite structural element according to claim 1, wherein:
said main structural member comprises a framed plate structure with a peripheral frame and said auxiliary member is disposed within said frame.

9. The fiber-reinforced composite structural element according to claim 1, wherein:
said main structural member comprises a segment of a substantially cylindrical structure and said auxiliary member is provided on a surface of said segment.

10. A fiber-reinforced composite structural member, comprising:
a fibrous preform including a lamination of a plurality of reinforcing fiber material layers superposed on top of each other into a box configuration; and
said preform being impregnated with a resin and cured to form an integral structural element in combination with another structural member.

11. The structural member according to claim 1, wherein:
each of said reinforcing fiber material layers comprises:
a plurality of first parallel threads extending in a first direction on a bottom plane of a box with side planes defining a box opening and also extending in a direction away from said bottom plane on opposite planes of said side planes;
a plurality of second parallel threads extending in a second direction across said first direction on said bottom plane and also extending in a direction away from said bottom plane on other opposite planes of said side planes; and
said first and second threads forming a woven fabric.

12. The structural member according to claim 2, wherein;
said first and second directions are parallel to said side planes.

13. The structural member according to claim 2, wherein;
said first and second directions are diagonal with respect to said bottom plane.

14. The structural member according to claim 1, wherein;
each of said reinforcing fiber material layers comprises unidirectional threads.

15. A method of manufacturing the fiber-reinforced composite structural element defined in claim 1, comprising the steps of:
superposing said plurality of first reinforcing threads and said second reinforcing to form said three-dimensional configuration of said fibrous preform;
combining said fibrous preform with reinforcing fibrous material forming said structural member;
disposing within a mold said fibrous preform together with said fibrous material forming the structural member;
supplying a resin into an interior of said mold to impregnate the resin in both said fibrous preform and said fibrous material forming the structural member; and
subjecting said fibrous preform and said fibrous material impregnated with said resin to a curing operation to obtain the composite structural element.

16. The method of manufacturing a fiber-reinforced composite structural element according to claim 15, wherein:
said fibrous preform has woven material layers.

17. The method of manufacturing a fiber-reinforced composite structural element according to claim 15, wherein:
said fibrous material forming said structural member has woven fabric layers.

18. The method of manufacturing a fiber-reinforced composite structural element according to claim 15, wherein:
said fibrous material forming said structural member has unidirectional thread layers.

19. The method of manufacturing a fiber-reinforced composite structural element according to claim 15, wherein:
said three-dimensional configuration is a box configuration.

20. The method of manufacturing a fiber-reinforced composite structural element according to claim 15, further comprising the steps of:
cutting the fibrous preform into segments; and
combining said segments with said reinforcing fibrous material forming said structural member.

21. The method of manufacturing a fiber-reinforced composite structural element according to claim 15, wherein:
said structural member is a beam with a web and flanges and said fibrous preform is combined with the beam such that the preform is disposed on the web between the flanges.

22. The method of manufacturing a fiber-reinforced composite structural element according to claim 15, wherein:
said structural member is a flanged plate structure with a peripheral flange and said fibrous preform is combined with the plate structure such that the preform is disposed within said flange.

23. The method of manufacturing a fiber-reinforced composite structural element according to claim 15, wherein:
said structural element is a segment of a substantially cylindrical structure and said fibrous preform is combined with a surface of the segment.

24. A method of manufacturing a fiber-reinforced composite structural member defined in claim 1, comprising the steps of:
providing a box-shaped jig having a bottom surface directed upward and having side walls extending downward from said bottom surface;
placing said first reinforcing threads and second reinforcing threads on said bottom surface of the jig;
causing portions of said first reinforcing threads and said second reinforcing threads, extending outward beyond said bottom surface, to extend downward along said side walls to produce an inverted-box-shaped dry preform;
impregnating said preform with a resin; and
curing the preform.

25. The method of manufacturing a fiber-reinforced composite structural member according to claim 24, wherein:
said preform comprises woven fabric layers.

26. The method of manufacturing a fiber-reinforced composite structural member according to claim 24, wherein:
said preform comprises unidirectional thread layers.

27. The fiber-reinforced composite structural element defined in claim 1, wherein said fibrous preform further comprises
a parallel piped box-shaped body including a planar wall having four sides, four side walls extending perpendicularly from said planar wall such that each side wall depends from a respective side of said planar wall, and a resin impregnated in said body to retain a box shape,
said body including said plurality of first reinforcing threads extending in said first direction and said plurality of second reinforcing threads extending in said second direction across the first direction, and said plurality of first reinforcing threads and said plurality of second reinforcing threads extend in and along said planar wall and in and along said side walls.

28. The fiber-reinforced composite structural element according to claim 27, wherein said fibrous preform further comprises a plurality of third reinforcing threads extending in and along said side walls across said plurality of first reinforcing threads and said plurality of second reinforcing threads; and wherein said plurality of first reinforcing threads run parallel to a first pair of opposite side walls in and along said planar wall and in and along a second pair of opposite side walls, said plurality of second reinforcing threads run parallel to said second pair of opposite side walls in and along said planar wall and in and along said first pair of opposite side walls.

29. The fiber-reinforced composite structural element according to claim 28, wherein said plurality of first reinforcing threads, said plurality of second reinforcing threads, and said plurality of third reinforcing threads are carbon fiber threads.

30. The fiber-reinforced composite structural element according to claim 28, wherein said plurality of first reinforcing threads, said plurality of second reinforcing threads, and said plurality of third reinforcing threads form a laminated structure of a plurality of woven fabric layers.

31. The fiber-reinforced composite structural element according to claim 27, wherein said plurality of first reinforcing threads and said plurality of second reinforcing threads extend diagonally in and along said planar wall with respect to said side walls.

32. The fiber-reinforced composite structural element according to claim 31, wherein said plurality of first reinforcing threads and said plurality of second reinforcing threads are carbon fiber threads.

33. The fiber-reinforced composite structural element according to claim 31, wherein said plurality of first reinforcing threads and said plurality of second reinforcing threads form a laminated structure of a plurality of woven fabric layers.

34. The fiber-reinforced composite structural element according to claim 31, wherein said plurality of first reinforcing threads and said plurality of second reinforcing threads are perpendicular to each other.

35. The fiber-reinforced composite structural element defined in claim 1 further comprising a stiffening member comprising two side portions attached along side walls, wherein said two side portions are formed by dissecting said preform element about a central axis running parallel to two opposite side walls.

36. A fiber-reinforced composite structural element, comprising:

a structural member having reinforcing fibrous material;

an auxiliary member;

said auxiliary member being a fibrous preform including a lamination of a plurality of reinforcing fibrous material layers superposed on top of each other into a three-dimensional configuration; said fibrous preform being combined together with said reinforcing fibrous material forming said structural member and being molded integrally into a configuration with a resin impregnated in both the structural member and the auxiliary member;

said structural member being a panel member having at least one flange portion; and said auxiliary member being a box-shaped preform with a closed bottom and an opening, said auxiliary member being disposed in an abutting relationship with said at least one flange portion to reinforce the structural member.

37. A fiber-reinforced composite structural element, comprising:

a structural member including a reinforcing fibrous material;

an auxiliary member;

said auxiliary member being a fibrous preform including a lamination of a plurality of reinforcing fibrous material layers superposed on top of each other into a three-dimensional configuration; said fibrous preform being combined together with said reinforcing fibrous material forming said main structural member and being molded integrally into a configuration with a resin impregnated in both the structural member and the auxiliary member;

said structural member being a panel member having at least one flange portion; and said auxiliary member being a split segment of a box-shaped preform with a closed bottom and an opening, said auxiliary member being disposed in abutting relationship with said at least one flange portion to reinforce the structural member.

* * * * *